United States Patent
Lin et al.

(10) Patent No.: US 7,830,912 B2
(45) Date of Patent: Nov. 9, 2010

(54) COMMUNICATIONS DEVICE CAPABLE OF SIMULTANEOUSLY OPERATING IN A DUAL-BAND CDMA COMMUNICATIONS SYSTEM AND A DUAL-BAND GSM COMMUNICATIONS SYSTEM

(75) Inventors: Kun-Lang Lin, Taipei Hsien (TW); Yung-Jinn Chen, Taipei Hsien (TW)

(73) Assignee: Wistron NeWeb Corporation, Hsi-Chih, Taipei Hsien (TW)

( * ) Notice: Subject to any disclaimer, the term of this patent is extended or adjusted under 35 U.S.C. 154(b) by 616 days.

(21) Appl. No.: 11/870,425

(22) Filed: Oct. 11, 2007

(65) Prior Publication Data
US 2008/0139243 A1  Jun. 12, 2008

(30) Foreign Application Priority Data
Dec. 7, 2006  (TW) .............................. 95145655 A

(51) Int. Cl.
*H04J 3/16* (2006.01)
*H04B 7/208* (2006.01)
*H04B 7/216* (2006.01)
*H04B 1/44* (2006.01)

(52) U.S. Cl. ...................... 370/466; 370/320; 370/344; 455/78; 455/83

(58) Field of Classification Search ................. 370/320, 370/344, 466; 455/78, 83
See application file for complete search history.

(56) References Cited

U.S. PATENT DOCUMENTS

| | | | |
|---|---|---|---|
| 2003/0060170 A1* | 3/2003 | Tikka et al. | 455/73 |
| 2005/0136875 A1* | 6/2005 | Skarby et al. | 455/306 |
| 2005/0227631 A1* | 10/2005 | Robinett | 455/83 |
| 2005/0245201 A1* | 11/2005 | Ella et al. | 455/78 |
| 2006/0276158 A1* | 12/2006 | Okabe | 455/333 |

* cited by examiner

*Primary Examiner*—Ricky Ngo
*Assistant Examiner*—Paul Masur
(74) *Attorney, Agent, or Firm*—Winston Hsu; Scott Margo

(57) ABSTRACT

A communications device capable of simultaneously operating in a dual-band CDMA communications system having a cellular and a PCS CDMA communications systems and a dual-band GSM communications system having a GSM 900 and a GSM 1800 communications systems includes a radio signal transceiver module, a CDMA module, a GSM module, a first CDMA filtering unit, a second CDMA filtering unit, a first GSM filtering unit, and a second GSM filtering unit. The first CDMA filtering unit, the second CDMA filtering unit, the first GSM filtering unit, and the second GSM filtering unit are utilized for discarding signals in an overlapping frequency band between the dual-band CDMA and the dual-band GSM communications systems.

17 Claims, 8 Drawing Sheets

COMMUNICATIONS DEVICE CAPABLE OF SIMULTANEOUSLY OPERATING IN A DUAL-BAND CDMA COMMUNICATIONS SYSTEM AND A DUAL-BAND GSM COMMUNICATIONS SYSTEM

BACKGROUND OF THE INVENTION

1. Field of the Invention

The present invention relates to a communications device, and more particularly, to a communications device capable of simultaneously operating in a dual-band CDMA communications system and a dual-band GSM communications system.

2. Description of the Prior Art

As radio communications technology progresses, mobile phones of small sizes change the way people communicate. The mobile phones provide people an opportunity to exchange information any time anywhere. The prior art developed different mobile communications systems, such as Global System for Mobile communications (GSM), Code Division Multiple Access (CDMA), Wideband Code Division Multiple Access (WCDMA), Personal Digital Cellular (PDC), and Personal Handyphone System (PHS).

The GSM communications system is composed of the GSM communications systems with frequencies of 900 MHz and 1800 MHz. The GSM communications system of 1800 MHz is also named as Digital Cellular System (DCS). The receiving band of the GSM communications system of 900 MHz ranges between 925.2 MHz and 959.8 MHz. The transmission band of the GSM communications system of 900 MHz ranges between 880.2 MHz and 914.8 MHz. The receiving band of the GSM communications system of 1800 MHz ranges between 1805.2 MHz and 1879.8 MHz. The transmission band of the GSM communications system of 1800 MHz ranges between 1710.2 MHz and 1784.8 MHz. Thus, the GSM communications system is also named as the dual-band GSM communications system.

The CDMA communications system is composed of the cellular CDMA communications system of 800 MHz and the Personal Communications Services (PCS) CDMA communications system of 1900 MHz. The receiving band of the cellular CDMA communications system ranges between 869 MHz and 894 MHz. The transmission band of the cellular CDMA communications system ranges between 824 MHz and 849 MHz. The receiving band of the PCS CDMA communications system ranges between 1930 MHz and 1990 MHz. The transmission band of the PCS CDMA communications system ranges between 1850 MHz and 1910 MHz. Thus, the CDMA communications system is also named as the dual-band CDMA communications system.

From the description above, it is known that the frequency bands of the GSM communications system of 900 MHz and the cellular CDMA communications system partly overlap, and the frequency bands of the GSM communications system of 1800 MHz and the PCS CDMA communications system partly overlap. Please refer to FIG. 1 and FIG. 2. FIG. 1 is a diagram illustrating the overlapping frequency band of the GSM communications system of 900 MHz and the cellular CDMA communications system. FIG. 2 is a diagram illustrating the overlapping frequency band of the GSM communications system of 1800 MHz and the PCS CDMA communications system. In FIG. 1 and FIG. 2, the shadowed area represents the overlapping frequency band. Because of the overlapping frequency bands in FIG. 1 and FIG. 2, the prior art cannot provide mobile phones simultaneously operating in the GSM communications system of 900 MHz and the cellular CDMA communications system, or mobile phones simultaneously operating in the GSM communications system of 1800 MHz and the PCS CDMA communications system.

SUMMARY OF THE INVENTION

The present invention provides a communications device simultaneously operating in a dual-band Code Division Multiple Access (CDMA) communications system and a dual-band Global System for Mobile Communications (GSM). The dual-band CDMA communications system comprises a Personal Communications Services (PCS) CDMA communications system and a cellular CDMA communications system. The dual-band GSM communications system comprises a GSM communications system of 900 MHz and a GSM communications system of 1800 MHz. The communications device comprises a radio signal transceiver module for receiving and transmitting radio signals; a CDMA module for processing signals of the dual-band CDMA communications system and comprises a first duplexer coupled to the radio signal transceiver module, a second duplexer coupled to the radio signal transceiver module, a first CDMA receiving module coupled to the first duplexer for receiving signals of the PCS CDMA communications system, a first CDMA transmitting module coupled to the first duplexer for transmitting signals to the PCS CDMA communications system, a second CDMA receiving module coupled to the second duplexer for receiving signals of the cellular CDMA communications system, and a second CDMA transmitting module coupled to the second duplexer for transmitting signals to the cellular CDMA communications system; a GSM module for processing signals of the dual-band GSM communications system that comprises a first receiving/transmitting switch coupled to the radio signal transceiver module, a second receiving/transmitting switch coupled to the radio signal transceiver module, a first GSM receiving module coupled to the first receiving/transmitting switch for receiving signals of the GSM communications system of 900 MHz, a first GSM transmitting module coupled to the first receiving/transmitting switch for transmitting signals to the GSM communications system of 900 MHz; a second GSM receiving module coupled to the second receiving/transmitting switch for receiving signals of the GSM communications system of 1800 MHz; a second GSM transmitting module coupled to the second receiving/transmitting switch for transmitting signals to the GSM communications system of 1800 MHz; a first CDMA filtering unit coupled to the first CDMA transmitting module for filtering out signals of an overlapping frequency band between the PCS CDMA communications system and the GSM communications system of 1800 MHz outputted from the first CDMA transmitting module; a second CDMA filtering unit coupled to the second CDMA receiving module for filtering out signals of an overlapping frequency band between the cellular CDMA communications system and the GSM communications system of 900 MHz received by the second CDMA receiving module; a first GSM filtering unit coupled to the first GSM transmitting module for filtering out signals of an overlapping frequency band between the cellular CDMA communications system and the GSM communications system of 900 MHz; and a second GSM filtering unit coupled to the second GSM receiving module for filtering out signals of an overlapping frequency band between the PCS CDMA communications system and the GSM communications system of 1800 MHz received by the second GSM receiving module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
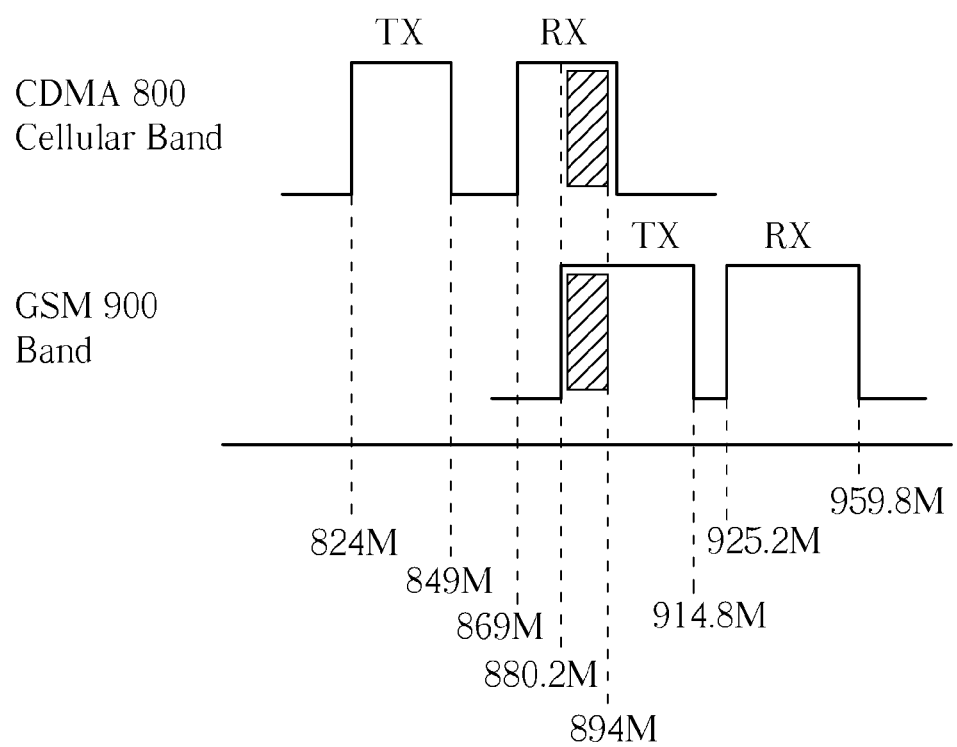
FIG. 1 is a diagram illustrating the overlapping frequency band of the GSM communications system of 900 MHz and the cellular CDMA communications system.
Figure 2:
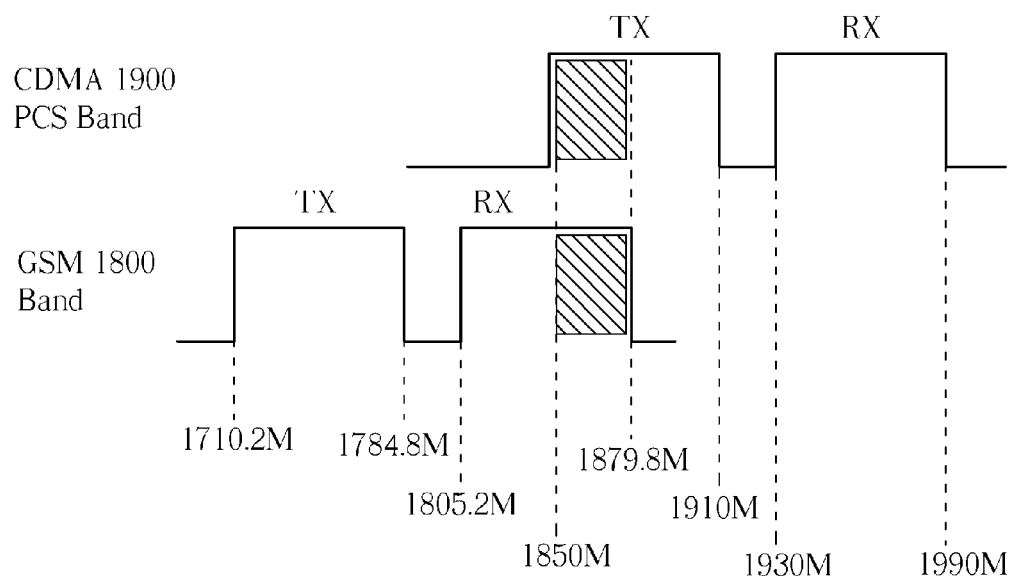
FIG. 2 is a diagram illustrating the overlapping frequency band of the GSM communications system of 1800 MHz and the PCS CDMA communications system.
Figure 3:
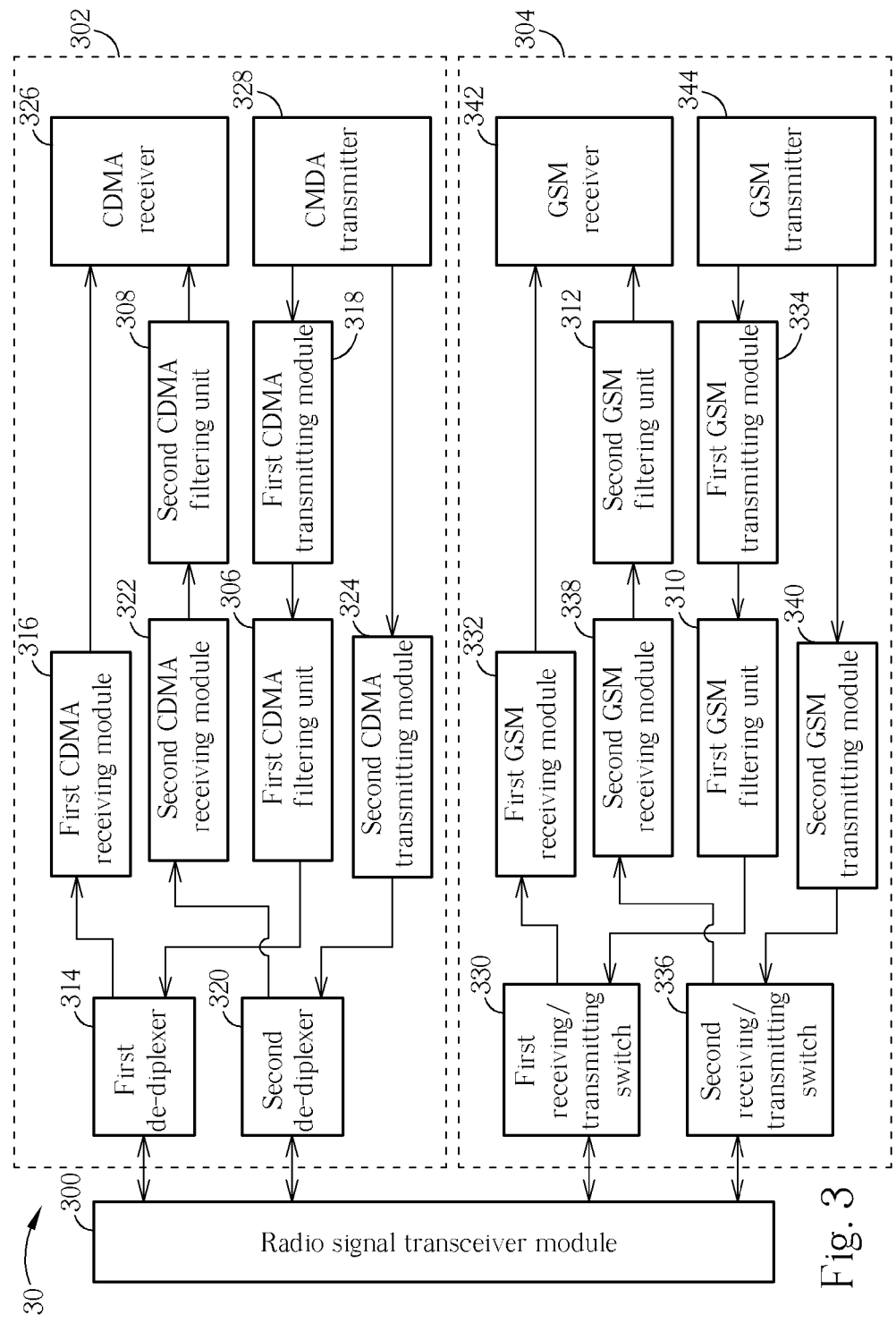
FIG. 3 is a diagram illustrating a communications device of a first embodiment of the present invention.

Please refer to FIG. 3. FIG. 3 is a diagram illustrating a communications device 30 of a first embodiment of the present invention. The communications device 30 is capable of simultaneously operating in the dual-band GSM communications system and the dual-band CDMA communications system. The dual-band CDMA communications system comprises a PCS CDMA communications system and a cellular CDMA communications system. The dual-band GSM communications system comprises a GSM communications system of 900 MHz and a GSM communications system of 1800 MHz. The communications device 30 comprises a radio signal transceiver module 300, a CDMA module 302, a GSM module 304, a first CDMA filtering unit 306, a second CDMA filtering unit 308, a first GSM filtering unit 310, and a second GSM filtering unit 312.

The radio signal transceiver module 300 is utilized for receiving and transmitting radio signals. The radio signal transceiver module 300 comprises an antenna and a diplexer, or comprises two antennas respectively corresponding to the CDMA module 302 and GSM module 304 and a diplexer. The details are described as follows.

The CDMA module 302 is utilized for processing signals of the PCS CDMA communications system and the cellular CDMA communications system. The CDMA module 302 comprises a first duplexer 314, a CDMA receiving module 316, a first CDMA transmitting module 318, a second duplexer 320, a second CDMA receiving module 322, a second CDMA transmitting module 324, a CDMA receiver 326, and a CMDA transmitter 328. The first duplexer 314, the first CDMA receiving module 316, and the first CDMA transmitting module 318 are utilized for receiving and transmitting the signals of the PCS CDMA communications system. The second duplexer 320, the second CDMA receiving module 322, and the second CDMA transmitting module 324 are utilized for receiving and transmitting the signals of the cellular CDMA communications systems. The CDMA receiver 326 is utilized for processing the received signals of the first CDMA receiving module 316 and the second CDMA receiving module 322. The CDMA transmitter 328 is utilized for outputting signals to the first CDMA transmitting module 318 and the second CDMA transmitting module 324.

On the other hand, the GSM module 304 is utilized for processing the signals of the GSM communications systems of 900 MHz and 1800 MHz. The GSM module 304 comprises a first receiving/transmitting switch 330, a first GSM receiving module 332, a first GSM transmitting module 334, a second receiving/transmitting switch 336, a second GSM receiving module 338, a second GSM transmitting module 340, a GSM receiver 342, and a GSM transmitter 344. The first receiving/transmitting switch 330, the first GSM receiving module 332, and the first GSM transmitting module 334 are utilized for receiving and transmitting the signals of the GSM communications system of 900 MHz. The second receiving/transmitting switch 336, the second GSM receiving module 338, and the second GSM transmitting module 340 are utilized for receiving and transmitting the signals of the GSM communications system of 1800 MHz. The GSM receiver 342 is utilized for processing the received signals of the first GSM module 332 and the second GSM receiving module 338. The GSM transmitter 344 is utilized for outputting signals to the first GSM transmitting module 334 and the second GSM transmitting module 340.

As those described above, the frequency bands of the GSM communications system of 900 MHz and the cellular CDMA communications system overlap, and the frequency bands of the GSM communications system of 1800 MHz and the PCS CDMA communications system overlap as well. Therefore, it disables the mobile phone of the prior art from operating simultaneously in the dual-band CDMA communications system and the dual-band GSM communications system. In the present invention, the first CDMA filtering unit 306 is coupled to the first CDMA transmitting module 318 for filtering the signals of a frequency band between 1850 and 1879.8 MHz out from the outputted signals of the first CDMA transmitting module 318. That is, the CDMA transmitting module 318 transmits signals of between 1879.8 and 1990 MHz. The second CDMA filtering unit 308 is coupled to the second CDMA receiving module 322 for filtering the signals of a frequency band between 880.2 and 894 MHz out from the received signals of the second CDMA receiving module 322. That is, the CDMA receiving module 322 receives signals of a frequency band between 824 and 894 MHz. The first GSM filtering unit 310 is coupled to the first GSM transmitting module 334 for filtering the signals of a frequency band between 880.2 and 894 MHz out from the outputted signals of the GSM transmitting module 334. That is, the GSM transmitting module 334 outputs signals of a frequency band between 894 and 959.8 MHz. The second GSM filtering unit 312 is coupled to the second GSM receiving module 338 for filtering the signals of a frequency band between 1850 and 1879.8 MHz out from the received signals of the second GSM receiving module 338. That is, the second GSM receiving module 338 receives signals of a frequency band between 1710.2 and 1850 MHz.

Therefore, with the first CDMA filtering unit 306 and the second GSM filtering unit 312, the outputted signals of the first CDMA transmitting module 318 do not interfere with the receiving operation of the second GSM receiving module 338. Similarly, with the first GSM filtering unit 310 and the second CDMA filtering unit 308, the outputted signals of the first GSM transmitting module 334 do not interfere with the receiving operation of the second CDMA receiving module 322. In this way, the CDMA receiver 326 and the GSM receiver 342 correctly receives the signals without being interfered with. Therefore, the communications devices capable of simultaneously operating in the dual-band CDMA communications system and the dual-band GSM communications system are realized by the present invention. In short, the communications device 30 filters out the signals of a frequency band between the overlapping frequency band of the GSM communications system of 900 MHz and the cellular CDMA communications system, and the signals of a frequency band between the overlapping frequency band of the GSM communications system of 1800 MHz and the PCS CDMA communications system. Therefore, the communications device 30 is capable of simultaneously operating in the dual-band CDMA communications system and the dual-band GSM communications system.

In the present invention, the first CDMA filtering unit 306 is utilized for filtering out the signals of a frequency band between the overlapping frequency bands of the first CDMA transmitting module 318 and the GSM communications system of 1800 MHz, which avoids the first GSM receiving module 338 operating incorrectly when the communications device 30 operates in both of the GSM and the CDMA communications systems. The second CDMA filtering unit 308 is utilized for filtering out the signals of a frequency band between the overlapping frequency bands of the second CDMA receiving module 322 and the GSM communications system of 900 MHz, which avoids the CDMA receiver 326 operating incorrectly when the communications device 30 operates in both of the GSM and the CDMA communications systems. Additionally, in the preferred embodiment of the present invention, the frequency band of the first CDMA filtering unit 306 and the second CDMA filtering unit 308 change according to operating mode of the communications device 30. Thus, when the communications device 30 operates in both of the GSM and CDMA communications system, the signals in the overlapping frequency band can be effectively filtered out, and when the communications device 30 does not operate in both of the GSM and CDMA communications systems, the communications quality is improved.

Figure 4:
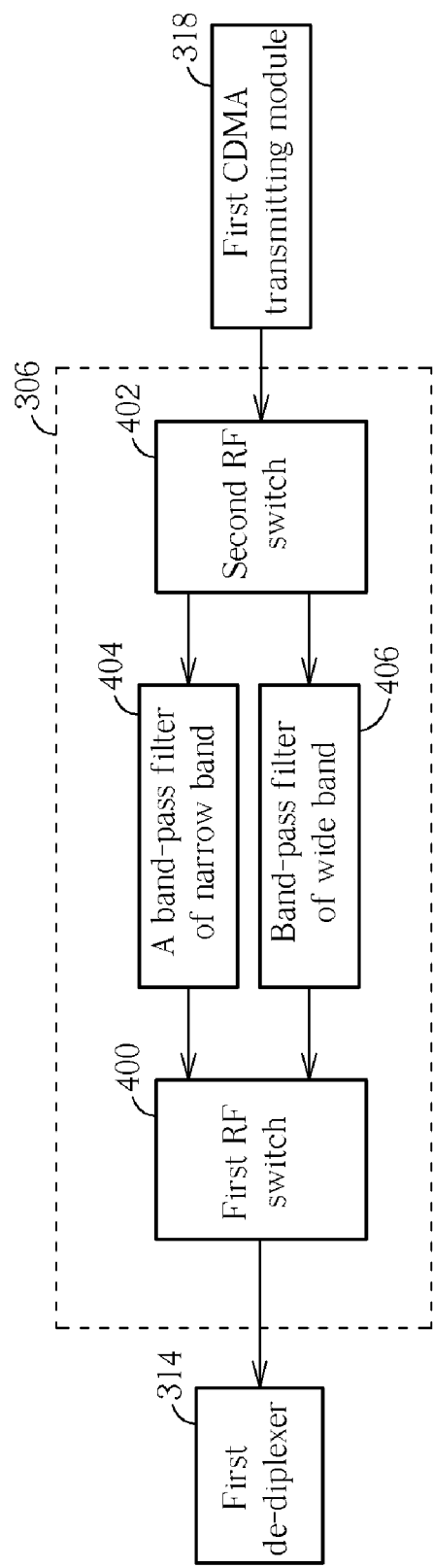
FIG. 4 is a diagram illustrating the first CDMA filtering unit.
Figure 5:
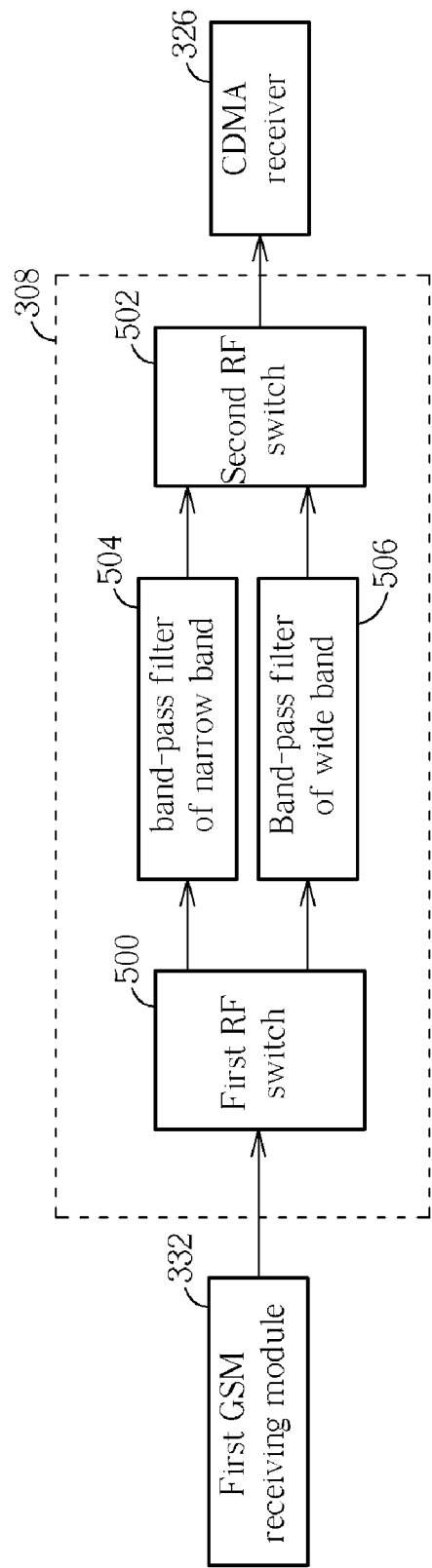
FIG. 5 is a diagram illustrating the second CDMA filtering unit.

For example, please refer to FIG. 4 and FIG. 5. FIG. 4 is a diagram illustrating the first CDMA filtering unit 306. FIG. 5 is a diagram illustrating the second CDMA filtering unit 308. In FIG. 4, the first CDMA filtering unit 306 comprises a first radio frequency (RF) switch 400, a second RF switch 402, a band-pass filter 404 of narrow band and a band-pass filter 406 of wide band. The first RF switch 400 and the second RF switch 402 control the frequency band between the first CDMA transmitting module 318 and the first duplexer 314 by selecting the band-pass filter 404 or the band-pass filter 406 to filter signals. When the communications device 30 operates in both of the GSM and CDMA communications system, the band-pass filter 404 is selected to filter the outputted signals of the first CDMA transmitting module 318. In this way, the second GSM receiving module 338 receives signals correctly. When the communications device 30 does not operate in both of the GSM and CDMA communications systems, the band-pass filter 406 is selected to filter the signals outputted from the first CDMA transmitting module 318 to enhance the communications quality.

Additionally, in FIG. 4, the band-pass filters 404 and 406 can be replaced with any other low pass filters. In FIG. 5, the second CDMA filtering unit 308 comprises a first RF switch 500, a second RF switch 502, a band-pass filter 504 of narrow band, and a band-pass filter 506 of wide band. The first RF switch 500 and the second RF switch 502 control the frequency band between the second CDMA receiving module 322 and the CDMA receiver 326 by selecting the band-pass filter 504 or the band-pass filter 506 to filter. When the communications device 30 operates in both of the GSM and CDMA communications systems, the band-pass filter 504 is selected to filter the outputted signals of the second CDMA receiving module 322. In this way, the CDMA receiver 326 receives signals correctly. When the communications device 30 does not operate in both of the GSM and CDMA communications systems, the band-pass filter 506 is selected to filter the outputted signals of the second CDMA receiving module 322 to enhance the communications quality.

In FIG. 4 and FIG. 5, the band-pass filters 406 and 506 are selected to filter the harmonic or spurious signals for enhancing the communications quality when the communications device 30 does not operate in both of the GSM and CDMA communications systems. However, if the harmonic or spurious signals are ignorable, the signals can be directly passed through and the band-pass filters 406 and 506 are removed for reducing production costs.

Figure 6:
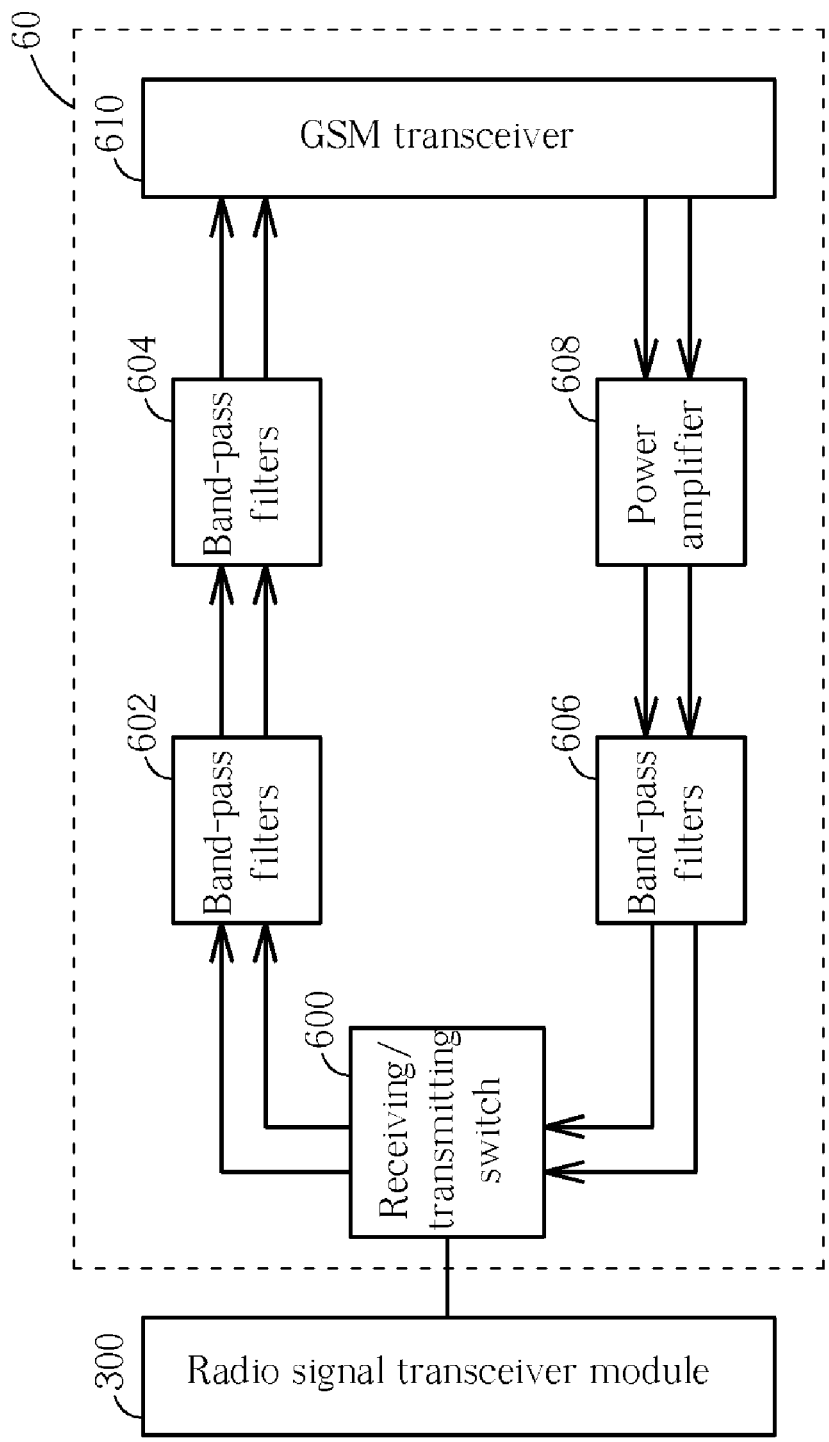
FIG. 6 is a diagram illustrating a GSM module.

Furthermore, the GSM module 304 can be appropriately arranged for saving layout area because of the same communications standard of the GSM communications systems of 900 MHz and 1800 MHz. Please refer to FIG. 6. FIG. 6 is a diagram illustrating a GSM module 60. The GSM module 60 is utilized for processing the signals of the GSM communications systems of 900 MHz and 1800 MHz, which can replace the GSM module 304. The GSM module 60 comprises a receiving/transmitting switch 600, band-pass filters 602, 604, and 606, a power amplifier 608, and a GSM transceiver 610. The receiving/transmitting switch 600 is a combination of the first receiving/transmitting switch 330 and the second receiving/transmitting switch 336 in FIG. 3 and utilized for switching the connections of the radio signal transceiver module 300. The power amplifier 608 is utilized for realizing the functions of the first GSM transmitting module 334. The power amplifier 608 further comprises surface acoustic wave filter (SAW filter) or other components. The band-pass filter 604 is utilized for realizing the functions of the second GSM receiving module 338. The band-pass filter 604 further comprises a SAW filter, a low noise amplifier (LNA), and other components. The function of the band-pass filter 602 is the same as the second GSM filtering unit 312. The band-pass filter 602 is utilized for filtering out the signals of the frequency band between 1850 MHz and 1879.8 MHz. Similarly, the band-pass filter 606 operates the same function as the first GSM filtering unit 310, which filters out the signals of the frequency band between 880.2 MHz and 894 MHz. The GSM transceiver 610 is the combination of the GSM receiver 342 and the GSM transmitter 344 and realizes the receiving function and the transmitting function of the GSM communications system.

Figure 7:
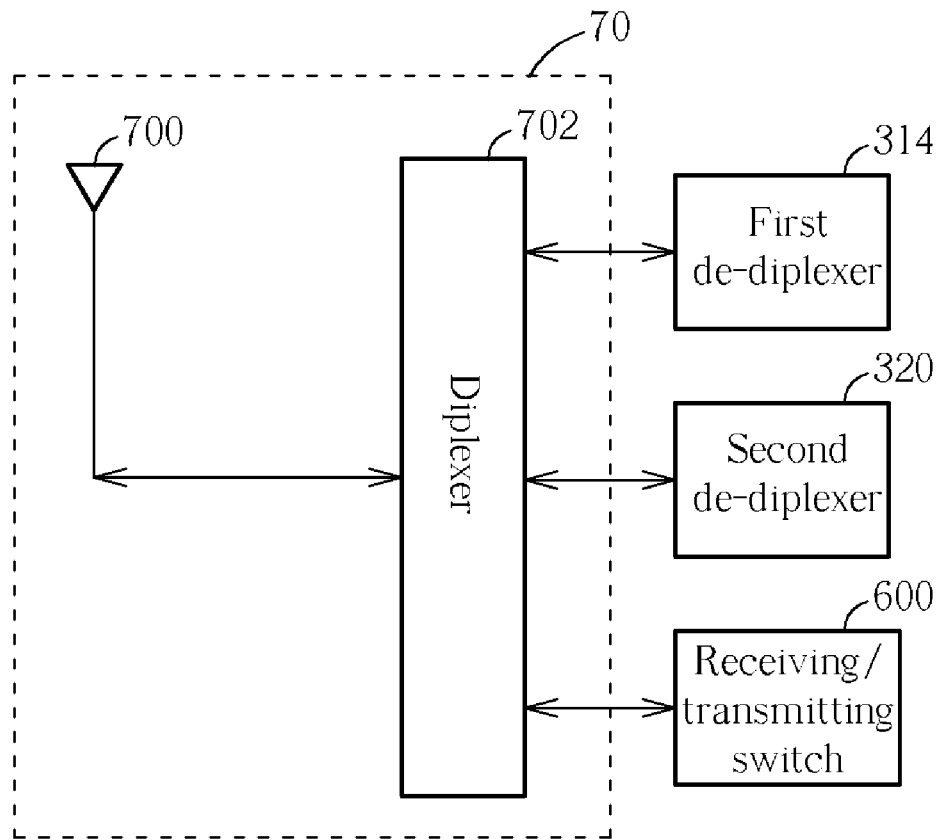
FIG. 7 is a diagram illustrating a radio signal transceiver.
Figure 8:
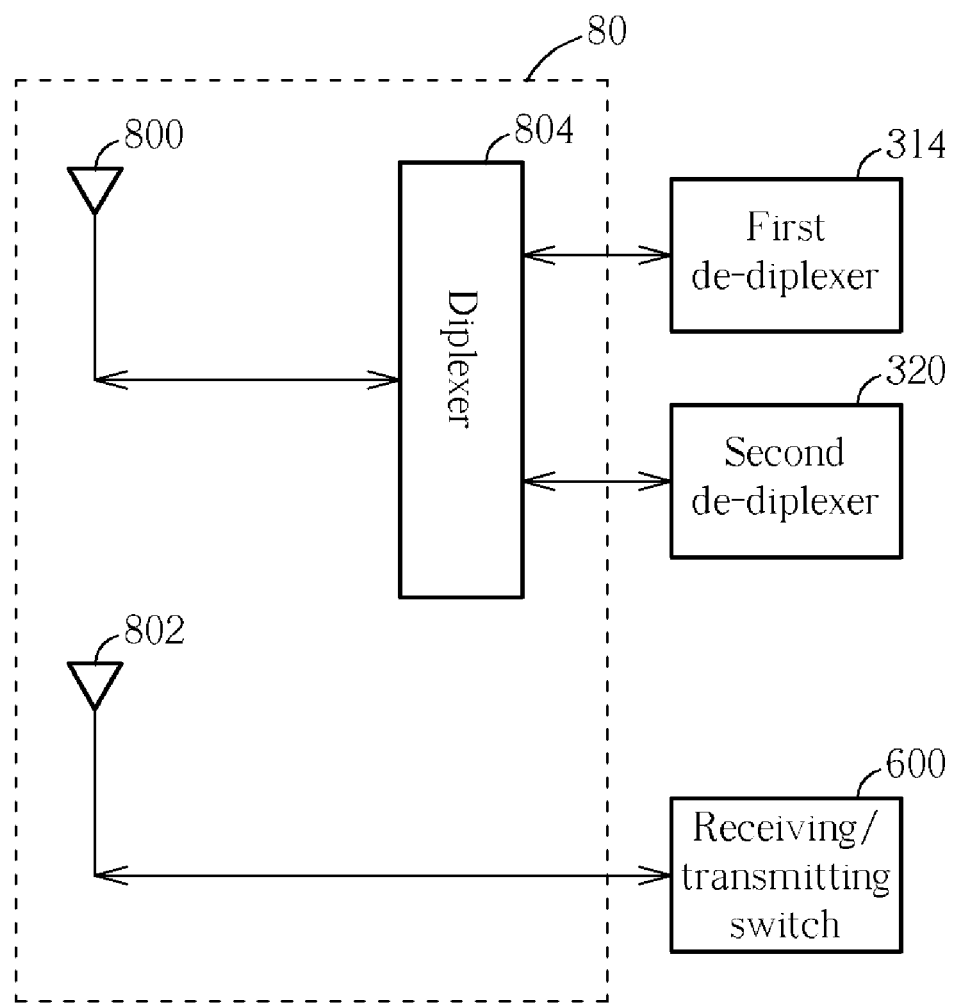
FIG. 8 is a diagram illustrating a radio signal transceiver.

As described above, the radio signal transceiver 300 can be comprised of an antenna and a diplexer, or comprised of two antennas and a diplexer. Please refer to FIG. 7 and FIG. 8. FIG. 7 is a diagram illustrating a radio signal transceiver 70. FIG. 8 is a diagram illustrating a radio signal transceiver 80. The radio signal transceivers 70 and 80 are both utilized to replace the radio signal transceiver 300. To simplify the related description, the CDMA module 302 in FIG. 3 and the GSM module 601 in FIG. 6 are taken as examples. In FIG. 7, the radio signal transceiver 70 comprises an antenna 700 and a diplexer 702. The diplexer 702 couples the antenna 700 to the first duplexer 314, the second duplexer 320, or the receiving/transmitting switch 600 according to the operation mode of the communications device 30. However, in this way, the antenna 700 has to be applicable to the dual-band CDMA communications system and the dual-band GSM communications system, which raises the complexity of the antenna design. In FIG. 8, the radio signal transceiver module 80 comprises the antennas 800, 802, and a diplexer 804. The diplexer 804 couples the antenna 800 to the first duplexer 314 or the second duplexer 320 according to the operation of the communications device 30. Therefore, the antennas 800 and 802 can be respectively designed for the dual-band CDMA communications system and the dual-band GSM communications system so that the complexity of the antenna design is lowered.

To sum up, the present invention provides a communications device that filters out the overlapping frequency band of the GSM communications system of 900 MHz and the cellular CDMA communications system, and the overlapping frequency band of the GSM communications system of 1800 MHz and the PCS CDMA communications system. Therefore, the communications device of the present invention can correctly operate in both of the dual-band GSM communications system and the dual-band CDMA communications system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communications device simultaneously operating in a dual-band Code Division Multiple Access (CDMA) communications system and a dual-band Global System for Mobile communications (GSM), the dual-band CDMA communications system comprising a Personal Communications Services (PCS) CDMA communications system and a cellular CDMA communications system, the dual-band GSM communications system comprising a GSM communications system of 900 MHz and a GSM communications system of 1800 MHz, the communications device comprising:
   a radio signal transceiver module for receiving and transmitting radio signals;
   a CDMA module for processing signals of the dual-band CDMA communications system, the CDMA module comprising:
      a first duplexer coupled to the radio signal transceiver module;
      a second duplexer coupled to the radio signal transceiver module;
      a first CDMA receiving module coupled to the first duplexer for receiving signals of the PCS CDMA communications system;
      a first CDMA transmitting module coupled to the first duplexer for transmitting signals to the PCS CDMA communications system;
      a second CDMA receiving module coupled to the second duplexer for receiving signals of the cellular CDMA communications system; and
      a second CDMA transmitting module coupled to the second duplexer for transmitting signals to the cellular CDMA communications system; and
   a GSM module for processing signals of the dual-band GSM communications system comprising:
      a first receiving/transmitting switch coupled to the radio signal transceiver module;
      a second receiving/transmitting switch coupled to the radio signal transceiver module;
      a first GSM receiving module coupled to the first receiving/transmitting switch for receiving signals of the GSM communications system of 900 MHz;
      a first GSM transmitting module coupled to the first receiving/transmitting switch for transmitting signals to the GSM communications system of 900 MHz;
      a second GSM receiving module coupled to the second receiving/transmitting switch for receiving signals of the GSM communications system of 1800 MHz;
      a second GSM transmitting module coupled to the second receiving/transmitting switch for transmitting signals to the GSM communications system of 1800 MHz;
      a first CDMA filtering unit coupled to the first CDMA transmitting module for filtering out signals of an overlapping frequency band between the PCS CDMA communications system and the GSM communications system of 1800 MHz outputted from the first CDMA transmitting module;
      a second CDMA filtering unit coupled to the second CDMA receiving module for filtering out signals of an overlapping frequency band between the cellular CDMA communications system and the GSM communications system of 900 MHz received by the second CDMA receiving module;
      a first GSM filtering unit coupled to the first GSM transmitting module for filtering out signals of an overlapping frequency band between the cellular CDMA communications system and the GSM communications system of 900 MHz; and
      a second GSM filtering unit coupled to the second GSM receiving module for filtering out signals of an overlapping frequency band between the PCS CDMA communications system and the GSM communications system of 1800 MHz received by the second GSM receiving module.

2. The communications device of claim 1 wherein the radio signal transceiver module comprises:
   a first antenna coupled to the first duplexer and the second duplexer; and
   a second antenna coupled to the first receiving/transmitting switch and the second receiving/transmitting switch.

3. The communications device of claim 1 wherein the radio signal transceiver module comprises:
   an antenna; and
   a diplexer coupled to the first duplexer, the second duplexer, the first receiving/transmitting switch, and the second receiving/transmitting switch.

4. The communications device of claim 1 wherein the first receiving/transmitting switch and the second receiving/transmitting switch are arranged in a single receiving/transmitting switch.

5. The communications device of claim 1 wherein the first CDMA filtering unit is a low pass filter.

6. The communications device of claim 1 wherein the first CDMA filtering unit is a narrow band band-pass filter.

7. The communications device of claim 1 wherein the second CDMA filtering unit is a narrow band band-pass filter.

8. The communications device of claim 1 wherein the first GSM filtering unit is a low-pass filter.

9. The communications device of claim 1 wherein the first GSM filtering unit is a band-pass filter.

10. The communications device of claim 1 wherein the second GSM filtering unit is a band-pass filter.

11. The communications device of claim 1 further comprising:
   a first signal process module disposed in the CDMA module for processing received signals of the CDMA module; and
   a second signal process module disposed in the GSM module for processing received signals of the GSM module.

12. The communications device of claim 11 wherein the first signal process module comprises:

a CDMA receiver for processing received signals of the first CDMA receiving module and the second CDMA receiving module; and a CDMA transmitter for transmitting signals to the first CDMA transmitting module and the second CDMA transmitting module.

13. The communications device of claim 11 wherein the second signal process module comprises:

a GSM receiver for processing received signals of the first GSM receiving module and the second GSM receiving module; and a GSM transmitter for transmitting signals to the first GSM transmitting module and the second GSM transmitting module.

14. The communications device of claim 1 wherein the first CDMA filtering unit comprises:

a first radio frequency switch coupled to the second duplexer;

a second radio frequency switch coupled to the first CDMA transmitting module;

a narrow band band-pass filter coupled between the first radio frequency switch and the second radio frequency switch; and a wide band band-pass filter coupled between the first radio frequency switch and the second radio frequency switch;

wherein the first radio frequency switch and the second frequency switch control signals transmitted from the first CDMA transmitting module to the second duplexer passing through the narrow band band-pass filter or the wide band band-pass filter.

15. The communications device of claim 14 wherein the wide band band-pass filter is a wire, such that a passing band of the wide band band-pass filter is infinite.

16. The communications device of claim 1 wherein the second CDMA filtering unit comprises:

a first radio frequency switch coupled to the second CDMA receiving module;

a second radio frequency switch coupled to an output end;

a narrow band band-pass filter coupled between the first radio frequency switch and the second radio frequency switch; and a wide band band-pass filter coupled between the first radio frequency switch and the second radio frequency switch;

wherein the first radio frequency switch and the second radio frequency switch control signals transmitted from the second CDMA receiving module to the output end passing through the narrow band band-pass filter or the wide band band-pass filter.

17. The communications device of claim 16 wherein the wide band band-pass filter is a wire, such that a passing band of the wide band band-pass filter is infinite.

* * * * *